(12) United States Patent
Friedebach

(10) Patent No.: US 10,434,678 B1
(45) Date of Patent: Oct. 8, 2019

(54) ALIGNMENT TOOL

(71) Applicant: TSO PRODUCTS, LLC, Fort Myers, FL (US)

(72) Inventor: Adolf Hans Friedebach, Fort Myers, FL (US)

(73) Assignee: TSO Products, LLC, Fort Myers, FL (US)

( * ) Notice: Subject to any disclaimer, the term of this patent is extended or adjusted under 35 U.S.C. 154(b) by 0 days.

(21) Appl. No.: 16/438,795

(22) Filed: Jun. 12, 2019

Related U.S. Application Data

(63) Continuation of application No. 15/748,089, filed as application No. PCT/US2017/040056 on Jun. 29, 2017, now Pat. No. 10,363,681.

(60) Provisional application No. 62/356,758, filed on Jun. 30, 2016.

(51) Int. Cl.
| | | |
|---|---|---|
| *B23P 11/00* | (2006.01) | |
| *B27B 9/04* | (2006.01) | |
| *B23D 47/02* | (2006.01) | |
| *B23D 59/00* | (2006.01) | |

(52) U.S. Cl.
CPC ............ *B27B 9/04* (2013.01); *B23D 47/02* (2013.01); *B23D 59/00* (2013.01)

(58) Field of Classification Search
CPC ........ B23P 11/00; B23P 11/1105; B23Q 1/03; B23Q 3/06
See application file for complete search history.

(56) References Cited

U.S. PATENT DOCUMENTS

| | | | |
|---|---|---|---|
| 2,458,370 A | 1/1949 | Geddes | |
| 3,586,077 A | 6/1971 | Pease | |
| 4,483,071 A | 11/1984 | te Kolste | |
| 5,931,726 A | 8/1999 | Peters | |
| 8,523,156 B2 | 9/2013 | Hou et al. | |
| 8,931,772 B2 | 1/2015 | Phillips | |
| 9,186,777 B2 | 11/2015 | Woods | |
| 9,481,061 B2 | 11/2016 | Merilainen | |
| 9,635,795 B2 | 4/2017 | Casserly et al. | |
| 10,363,681 B2 * | 7/2019 | Friedebach | B23D 59/00 |
| 2004/0010926 A1 | 1/2004 | Hampton | |

(Continued)

OTHER PUBLICATIONS

International Search Report and Written Opinion dated Sep. 15, 2017 for International Application No. PCT/US17/40056, Filed Jun. 29, 2017.

(Continued)

*Primary Examiner* — Lee D Wilson
(74) *Attorney, Agent, or Firm* — Cook Alex Ltd.

(57) ABSTRACT

An alignment tool for connection to a work component. The alignment tool includes a body, a retention member that extends upward from the body, a clamp assembly spaced from the retention member and being connected to the body, a first reference surface that extends upward from the body and is located between the retention member and where the clamp assembly is connected to the body. The clamp assembly has a fastener that extends toward the retention member and past the first reference surface of the body, wherein the clamp assembly is movable to draw a distal end of the fastener in a direction toward where the clamp assembly is connected to the body and the fastener is biased to move the distal end of the fastener toward the first reference surface.

20 Claims, 10 Drawing Sheets

(56) References Cited

U.S. PATENT DOCUMENTS

| | | |
|---|---|---|
| 2005/0061128 A1 | 3/2005 | Caughlin et al. |
| 2012/0079931 A1 | 4/2012 | Hansen |
| 2014/0026725 A1 | 1/2014 | Makropoulos |
| 2018/0207833 A1* | 7/2018 | Friedebach ............ B23D 59/00 |

OTHER PUBLICATIONS

Web page www.woodpeck.com/tracksquare.html showing a Track Square, and related photographs (date unknown but admitted to be prior art).

* cited by examiner

ALIGNMENT TOOL

CROSS-REFERENCE TO RELATED APPLICATION

This application is a continuation of U.S. patent application Ser. No. 15/748,089, filed Jan. 26, 2018, which claims the benefit of priority of U.S. Provisional Patent Application Ser. No. 62/356,758, filed Jun. 30, 2016 and PCT Application Serial No. PCT/US17/40056, filed Jun. 29, 2017, the disclosures of which are hereby incorporated by reference in their entirety.

BACKGROUND OF THE INVENTION

Field of the Invention

The present invention generally relates to tools that provide temporary or longer term connection to a work component to establish a precision gage or guide, and more particularly a quick and accurate way to removably join an alignment tool to a work component by using complementary reference surfaces.

Discussion of the Prior Art

The alignment and connection of separate elements of tools, fixtures, and guide assemblies often relies on use of channels, such as in the form of T-shaped slots, commonly referred to as "T-slots", in one or more of the components to be connected for temporary or longer term use. This has been satisfactory for many uses, but has serious limitations when precision and sturdiness of the connection are required. A common problem with such prior art configurations relates to the inaccuracy of the alignment as a result of necessary manufacturing tolerances of the components to be connected. In light of such component tolerances and the means of connection, the current state of the art for achieving precise alignment of temporary or longer term connected removable components continues to involve multiple steps and the need to check relative positioning and make adjustments to account for misalignments.

For instance, step one generally involves bringing components to be connected into close proximity and loosely connecting them with fastening means of a suitable type such as nuts and T-bolts that slide within the T-slots. Step two requires the application of a separate precision gage along surfaces of the components to provide the alignment guidance by positioning the components to be connected in the required relative position they will assume when connected and while removing any slack introduced by the fastening method and/or inherently present between the components to be connected. Step three requires careful tightening of the fastening means, in an effort to avoid causing any unintended displacement of the components relative to each other that would result in misalignment. This is necessary because tightening of the fastening means also can and often does introduce forces that tend to displace the components from their intended position. Step four requires verification to ensure the component relationship is still positioned accurately after tightening, with this check or inspection requiring further use of the separate precision gage or similar means.

This prior art process of connecting an alignment tool to a work component often is used when connecting an alignment tool to a track saw rail. A track saw rail typically includes an elongated aluminum extrusion having various surfaces that permit attachment of the track saw rail to a table or to a work piece that may be a sheet material to be cut, while providing a track along which a circular saw will slide via a slidable mating saw base. Common surfaces provided by a track saw rail include surfaces defined by a T-slot in the bottom of the rail. The T-slot structure permits traditional T-slot style connections as a principal means of alignment. Such traditional connections utilize an element within the T-slot, such as a bolt or T-bolt with a threaded shaft extending from the head and through the open slot of the T-slot. A mating knob or nut would be used with the bolt or T-bolt to apply a clamping load to the opposed cantilevered side walls of the T-slot. Alternatively, a nut or T-nut may slide within the T-slot and a bolt may extend through the open slot to apply the clamp load. The traditional T-slot style connections suffer due to tolerances that permit even an elongated head on a T-bolt or an elongated T-nut to become misaligned within a T-slot. The connection is especially susceptible to this when a user introduces torque to the clamping knob, nut or bolt which tends to tighten but also to move the element within the T-slot. To the extent that the components may have shifted during tightening, the connection then must be loosened and the process must be repeated until the connected components yield an intended combination in accordance with the separate precision gage.

No practical means has been introduced in the prior art that eliminates the need for use of a secondary tool, such as a separate precision gage, to try to align components while making a connection, or the need to further verify proper alignment has been achieved. Also, it is common in the prior art to periodically use the secondary tool to check for continued correct alignment, which is time consuming and bothersome.

SUMMARY OF THE INVENTION

The purpose and advantages of the present invention will be set forth in and apparent from the description and drawings that follow, as well as will be learned by practice of the claimed subject matter. It is the object of this invention to introduce an alignment tool and method of using the alignment tool that effectively provide a connection to a work component which is precise as well as simple, and resistant to unintended change during use.

The present disclosure provides example alignment tools that utilize new structures and methods of connection to a work component, which are demonstrated for use with a work component, for example, in the form of a track saw rail. The alignment tools take into account the structure of the elongated aluminum extrusion of the track saw rail and its various surfaces that permit attachment of the track saw rail to a table or work piece, including the surfaces defined by the typical T-slot in the bottom of the track saw rail. However, unlike the prior art, the inventive alignment tools do not rely on traditional T-slot style connections as the principal means of alignment, due to the aforementioned disadvantages of such traditional connections.

In contrast, the examples in the present disclosure rely on mating or bringing into abutting engagement existing complementary reference surfaces or guide surfaces, based on edges, features or shapes of the example alignment tools and work component to be connected, with the complementary reference surfaces or guide surfaces being of known accuracy suitable for repeatable precise mating without need for use of a secondary tool, such as a precision gage, to check the alignment between the components. It will be appreciated that within this disclosure, a reference surface or guide surface that is to be used for abutting engagement may be defined, for example, by a broad flat surface, or at least two spaced apart aligned features that could be provided by any flat, curved, pointed or other surfaces, which together may be considered to define an elongated surface for purposes of providing abutting engagement. The example alignment tools also employ a clamp assembly that applies a force to simply draw the components together at the complementary reference surfaces into abutting engagement, and therefore, does not introduce any torque or other forces that would tend to displace the components from an otherwise perfect alignment, as intended. The clamp assembly also may compensate for any dimensional difference resulting from normal manufacturing tolerances or similar causes by employing a suitably strong clamp load, such as may be applied by a biasing element, such as a spring between a fastener and a base, such as in a lever actuated clamp assembly having a latch as the fastener, or may be applied by other suitable clamp assembly structures, such as may include a threaded engagement, or the like, that is able to draw together the components by use of an alternative form of a fastener.

In a first aspect, the present disclosure provides an alignment tool for connection to a work component and for use in aligning the work component with a work piece, wherein the work component has at least a first reference surface that extends longitudinally in a first direction. The alignment tool includes a body having at least a first reference surface that extends longitudinally in the first direction and having at least one work piece guide surface that extends in a second direction that is perpendicular to the at least first reference surface, and a clamp assembly connected to the body and extending in the second direction past the at least first reference surface of the body, wherein when the alignment tool is to be connected to the work component, the clamp assembly is movable to engage the work component and to draw together and hold in abutting engagement the first reference surface of the alignment tool and the first reference surface of the work component.

In another aspect, the present disclosure provides an alignment tool for connection to a work component and for use in aligning the work component with a work piece, wherein the work component has at least a first side wall surface that extends longitudinally in a first direction. The alignment tool includes a body having at least a first guide surface that extends longitudinally in the first direction and having at least one work piece guide surface that extends in a second direction that is perpendicular to the at least one first guide surface, and a clamp assembly connected to the body and extending in the second direction past the at least first guide surface of the body, wherein when the alignment tool is to be connected to the work component, the clamp assembly is movable to engage the work component and to draw together and hold in abutting engagement the first guide surface of the alignment tool and the first side wall surface of the work component.

In a further aspect, the present disclosure provides a method of connecting an alignment tool to a work component for use in aligning the work component with a work piece, wherein the work component has at least a first side wall surface extending longitudinally in a first direction and at least a T-shaped slot spaced apart from the at least first side wall surface and extending longitudinally in the first direction. The method comprises the steps of: holding the alignment tool in a position adjacent an end of the work component, wherein the alignment tool includes a body having at least a first reference surface extending in the first direction, a retention element spaced from the at least first reference surface, at least a first guide surface extending in a second direction that is perpendicular to the first direction, and a clamp assembly connected to the body; moving the alignment tool toward the work component so as to insert the retention element into the T-shaped slot that is spaced from the at least first side wall surface of the work component; moving the at least first reference surface of the alignment tool into a position opposite the first side wall surface of the work component; extending a fastener of the clamp assembly in the second direction beyond the first side wall surface of the work component; moving the clamp assembly to engage the first side wall surface of the work component and to draw together and hold in abutting engagement the at least first reference surface of the alignment tool and the first side wall surface of the work component.

As above noted, the example alignment tools and example methods of assembling an alignment tool to a work component of this disclosure provide several advantageous features. The example alignment tools and methods provide the ability to quickly and conveniently connect the alignment tool to a work component, without need to use a separate gage to check the accuracy of the alignment between the two components, or to use any tools. Additionally, the clamp assembly holds the two components together firmly and makes the connection highly resistant to unintended misalignment during handling of the connected components, which may be aided by a biasing element. A quick and firm connection of the two components is provided.

It is to be understood that both the foregoing general description and the following detailed description are exemplary and provided for purposes of explanation only, and are not restrictive of the subject matter claimed. Further features and objects of the present disclosure will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein.

Figure 1:
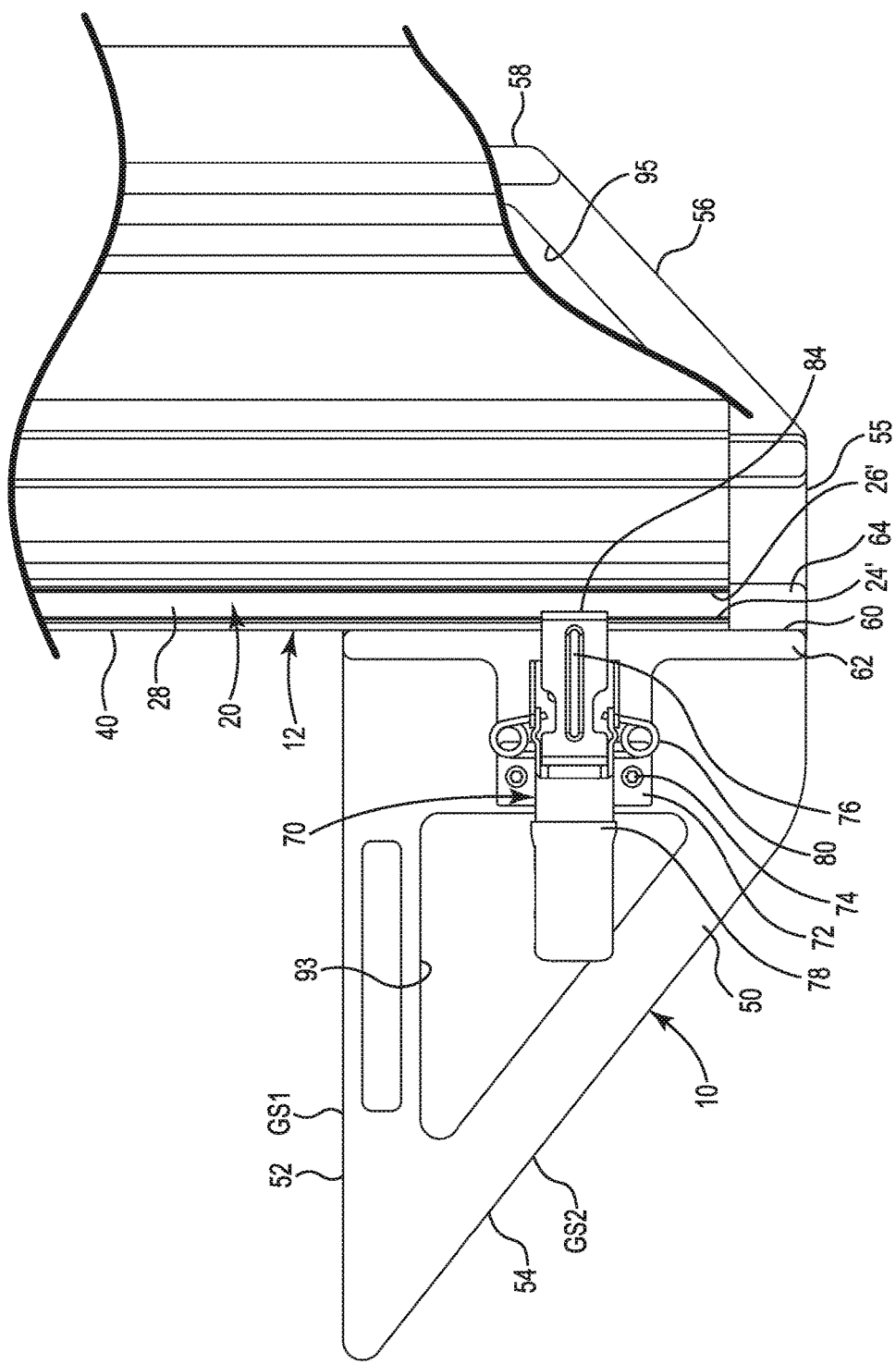
FIG. 1 is a top view of a first example alignment tool removably connected to a work component in the form of a track saw rail proximate a first end of track saw rail.

It should be understood that the drawings are not to scale. While some mechanical details of example alignment tools, including other plan and section views of the examples shown and of examples that may have alternative configurations have not been included, such details are considered well within the comprehension of those of ordinary skill in the art in light of the present disclosure. It also should be understood that the present invention is not limited to the example embodiments illustrated.

DETAILED DESCRIPTION OF THE PREFERRED EMBODIMENTS

For the following defined terms, these definitions shall be applied, unless a different definition is given in the claims or elsewhere in this disclosure. As used in this disclosure and the claims, the singular forms "a", "an", and "the" include plural referents unless the content clearly dictates otherwise. As used in this disclosure and the claims, the term "or" is generally employed in its sense including "and/or" unless the content clearly dictates otherwise.

Referring generally to FIGS. 1-10, it will be appreciated that alignment tools of the present disclosure generally may be embodied within numerous configurations, and may be used in various ways to enhance the convenience of users. Indeed, while acknowledging that all of the example configurations of alignment tools need not be shown herein, examples are provided to better demonstrate that a variety of configurations and methods of use are contemplated.

Turning to a first example embodiment of an alignment tool 10 shown in FIGS. 1-5, it will be appreciated that the alignment tool 10 and a work component 12 to which it will be connected may employ either existing or purpose made suitable complementary mating reference surfaces that are based on edges, features or shapes of the respective components. As noted previously, such complementary reference surfaces or guide surfaces that are to be used for abutting engagement may be defined, for example, by a broad flat surface, or at least two spaced apart aligned features that could be provided by any flat, curved, pointed or other surfaces, which together may be considered to define an elongated surface for purposes of providing abutting engagement, and which may be of known accuracy suitable for repeatable precise mating without need for use of a secondary tool.

One possible application is shown in the first example embodiment of the alignment tool 10, which may be removably connected to the work component 12. In this example, the work component 12 is shown as a track saw rail, which essentially is a metal extrusion in the form of a track for guiding power tools, such as a track saw. For example, the track 12 may be used with a handheld circular saw for cutting a work piece, such as a flat sheet material, which may be plywood, pressboard or other materials. In the particular configuration shown, the work component 12 may be used with a circular saw designed to be used with the track. Thus, the saw may incorporate or accommodate a base that is adapted for precision sliding movement along the extruded track 12.

In this particular example, among other shapes and surfaces, the extruded track of the work component 12 includes a first T-slot 20, which is longitudinally extending and upward facing. The T-slot 20 features a channel 22 having a first side wall 24 and a second side wall 26. The upper ends of the side walls 24, 26 include lips 24', 26' that extend toward each other and the opposed lips 24', 26' define an open slot 28 therebetween. The work component 12 also includes a second T-slot 30, which is longitudinally extending and downward facing. The T-slot 30 is parallel to the T-slot 20, and thus parallel to and spaced apart from the first side wall 24. The T-slot 30 features a channel 32 having a first side wall 34 and a second side wall 36. The lower ends of the side walls 34, 36 include lips 34', 36' that extend toward each other and the opposed lips 34', 36' define an open slot 38 therebetween.

The work component 12 includes reference surfaces that may be used when connecting an alignment tool 10 to the work component 12. The example alignment tool 10 may be configured to be connected in a precisely aligned relationship with the work component 12 via use of complementary reference surfaces. The upward facing first T-slot 20 is located along an outer edge of the work component 12, such that the first side wall 24 includes an outer surface, which may be referred to as a first side wall surface or first reference surface 40. The first side wall surface or first reference surface 40 of the work component 12 extends longitudinally in a first direction.

The bottom of the work component 12 provides a second reference surface 42, which is perpendicular to the first side wall surface or first reference surface 40 of the work component 12. The downward facing second T-slot 30 is open along the bottom of the work component 12 and located along a central region of the work component 12, spaced apart from the first side wall 24. The T-slot 30 also extends longitudinally in the first direction. For purposes of the present disclosure, the upward facing surface of the lips 34', 36', which are within the T-slot 30, collectively present a third reference surface 44 of the work component 12. An inner surface of the first side wall 24 presents a fourth reference surface 46 of the work component 12. It will be appreciated that each reference surface of the work component 12 extends longitudinally along at least a portion of the length of the work component 12 and may extend in a continuous or segmented manner, or otherwise may be defined by at least two spaced apart features or portions.

The alignment tool 10 is configured to achieve precise alignment with the work component 12 via abutting complementary reference surfaces, while also providing one or more guide surfaces for abutting a work piece or other object to be cut or otherwise positioned by use of the alignment tool. The alignment tool 10 includes a body 50 that may be constructed for example of machined aluminum, but it will be appreciated that the body may be constructed of any suitable rigid material, whether machined, cast or molded. In this example, an outer perimeter of the body 50 includes a first side wall 52, second side wall 54, third side wall 55, fourth side wall 56 and fifth side wall 58. It will be appreciated that other configurations may be provided with fewer or more side walls, and the side walls may provide guide surfaces. For example, the first side wall 52 presents a first work piece guide surface GS1, while the second side wall 54 may present a second work piece guide surface GS2. It will be appreciated that a guide surface may extend along at least a portion of a side wall or other surface of the body 50 and may extend in a continuous or segmented manner, or otherwise may be defined by at least two spaced apart features or portions.

The body 50 of the alignment tool 10 also includes a first guide surface or first reference surface 60 provided by an upstanding rib or wall 62 that extends longitudinally in the first direction, and is located along a central region of the body 50. It will be appreciated that the first work piece guide surface GS1 extends in a second direction that is perpendicular to the first guide surface or first reference surface 60. It also will be appreciated that the first guide surface or first reference surface 60 also extends in an upright direction.

The body 50 further includes a second guide surface or second reference surface 64, which is upward facing, and therefore, perpendicular to the first guide surface or first reference surface 60. The second guide surface or second reference surface 64 provides a landing against which the work component 12 may rest. Although they are shown as continuous elongated surfaces, it will be appreciated that each of the first and second reference surfaces 60, 64 of the alignment tool 10 may extend in a continuous or segmented manner, or otherwise may be defined by at least two spaced apart features or portions.

The alignment tool 10 further includes a clamp assembly 70. The clamp assembly 70 is configured to be mounted to the body 50 of the alignment tool 10 and to extend in the second direction past at least the first guide surface or first reference surface 60 of the alignment tool 10. The example clamp assembly 70 includes a base 72 that is connected to the body 50, such as by mechanical anchors 74 in the form of bolts or rivets, or by other suitable methods of connection. In this example, the clamp assembly 70 also includes a fastener 76 in the form of a latch, a lever 78, and biasing element 80 that is connected to the base 72, lever 78 and latch 76. The fastener or latch 76, lever 78 and biasing element 80 are constructed and connected to permit the lever 78 to operate the latch 76, under the influence of the bias element 80.

The fastener or latch 76 extends in the second direction past the first guide surface or first reference surface 60 of the alignment tool 10, as well as past the first side wall surface or first reference surface 40 of the work component 12. This permits that fastener or latch 76 to capture the work component 12. More particularly, the latch 76 includes a flange 82 at the distal end 84 of the latch 76. It will be appreciated that, as the latch 76 extends in the second direction, perpendicular to and across the first guide surface or first reference surface 60 of the alignment tool 10, it also extends parallel to the work piece guide surface GS1. Accordingly, when the lever 78 is pivoted upward, the latch 76 moves to extend further from the base 72, which allows the latch 76 to pivot to raise the flange 82 at the distal end 84, to assume the open position shown in FIG. 4. The pivotal positions of the lever 78 and latch 76 are configured to have an over-center movement to a closed position, which utilizes the biasing element 80, in the form of a spring, so that when the lever 78 is pivoted downward toward the closed position shown in FIGS. 1-3, the flange 82 of the latch 76 has been drawn closer toward the base 72 of the clamp assembly 70.

Figure 2:
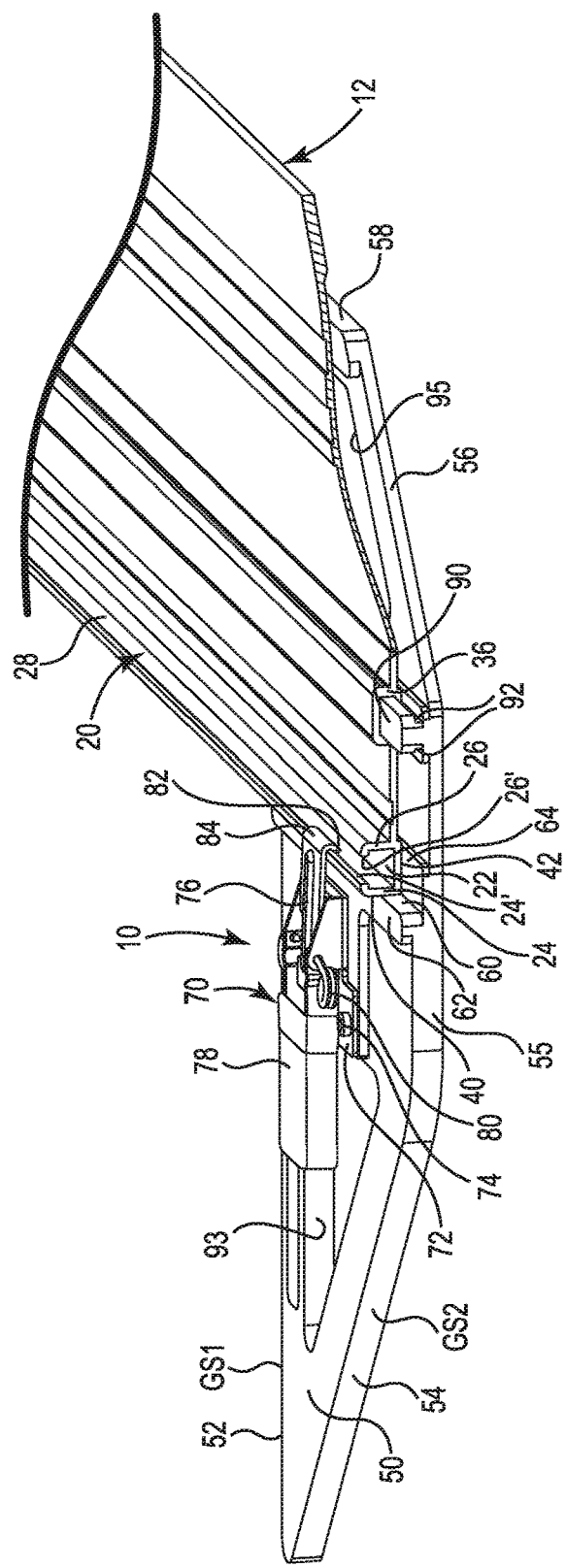
FIG. 2 is a perspective end view of the first example alignment tool removably connected to the work component of FIG. 1.
Figure 3:
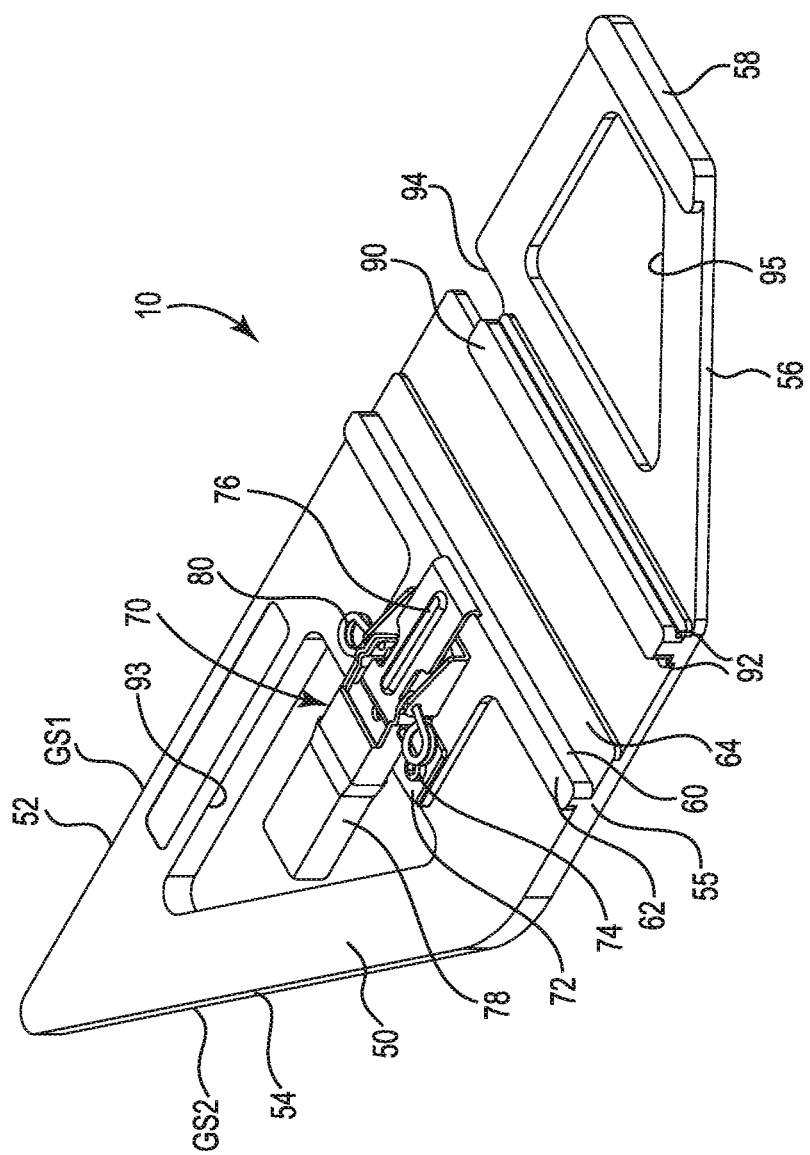
FIG. 3 is a perspective top view of the first example alignment tool of FIG. 1, with the clamp assembly in a closed position.
Figure 4:
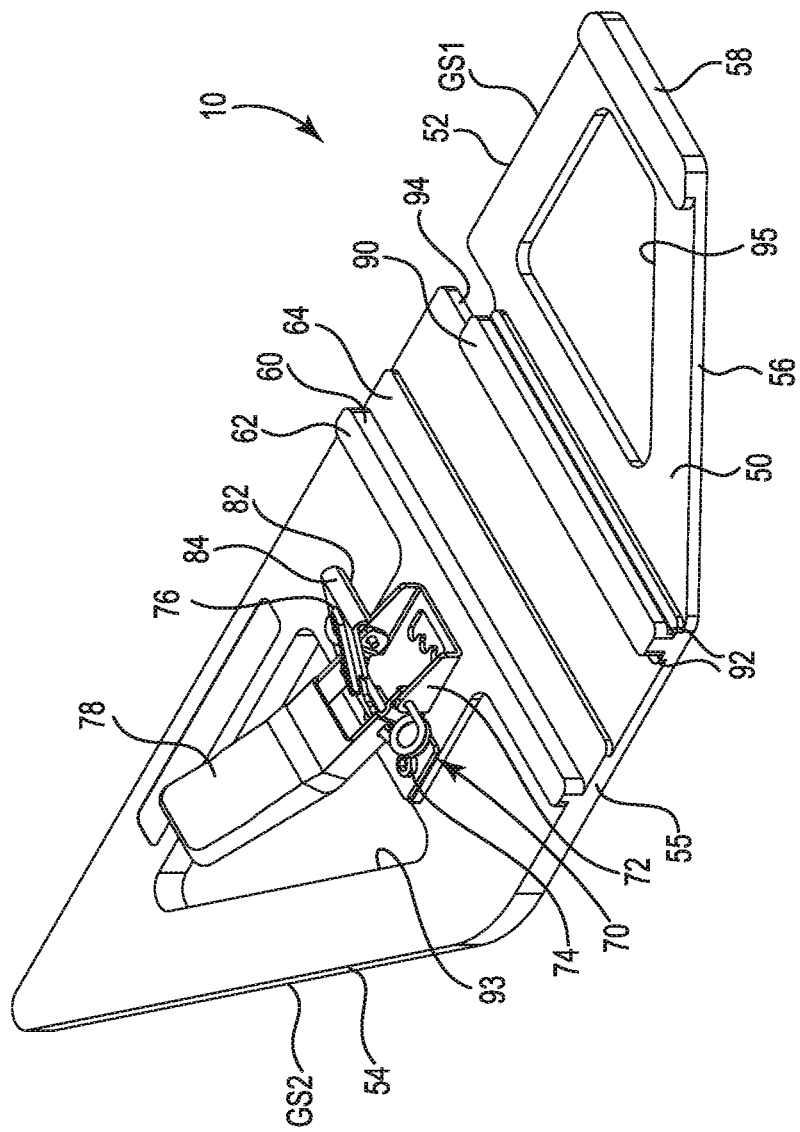
FIG. 4 is a perspective top view of the first example alignment tool of FIG. 1, with the clamp assembly in an open position, ready for slidable introduction to the work component.
Figure 5:
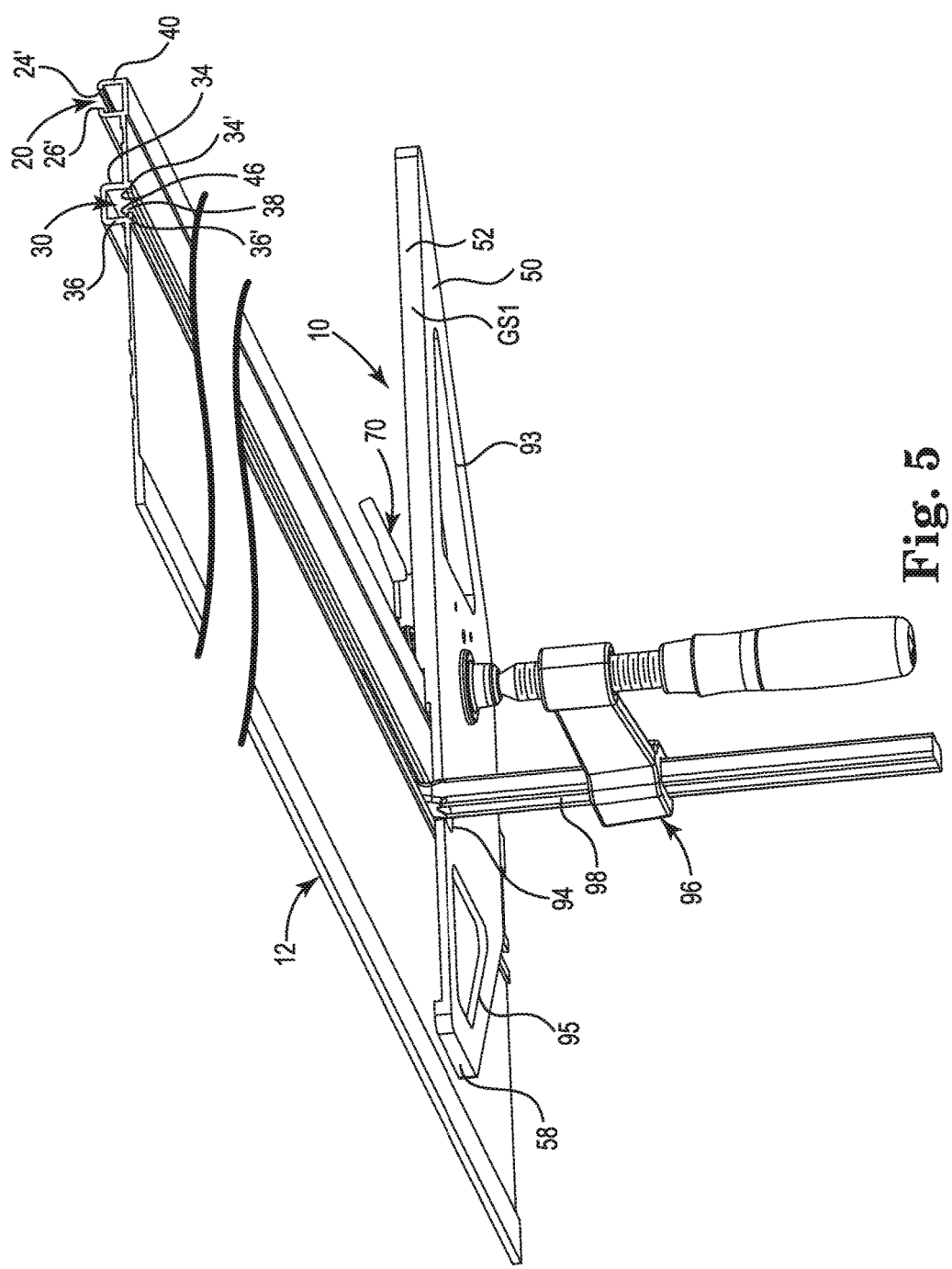
FIG. 5 is a perspective bottom view of the first example alignment tool removably connected to the work component of FIG. 1 and positioned relative to a work piece with a portion of a clamp passing through a clamp receiving notch.

FIG. 2 is particularly instructive regarding the connection of the alignment tool 10 and work component 12. FIG. 2 shows the first guide surface or first reference surface 60 of the alignment tool 10 has been brought into abutting engagement with the first side wall surface or first reference surface 40 provided by the outer surface of the first side wall 24 of the work component 12. The second reference surface 64 of the alignment tool 10 also has been brought into abutting engagement with the second reference surface of 42 of the work component 12. The flange 82 at the distal end 84 of the fastener or latch 76 also has been positioned to extend past the first guide surface or first reference surface 60 of the alignment tool 10 and past the first side wall surface or first reference surface 40 of the work component 12, and has been pivoted downward, so as to engage the lip 24' at the third reference surface 44 on the inner surface of the first side wall 24 of the work component 12. With the lever 78 pivoted downward to a closed position, the fastener or latch 76 and its flange 82 are pulled toward the base 72 until the first guide surface or first reference surface 60 of the alignment tool 10 is securely abutting the first side wall surface or first reference surface 40 of the work component 12.

In this example, the over-center travel of the lever 78 causes it to automatically be retained in the closed position, until a deliberate force is applied to move the lever 78 by pivoting to an open position. In addition, the biasing element 80 biases the latch 76 toward the base 72, which additionally aids in maintaining a firm connection between the alignment tool 10 and work component 12. Thus, actuation of the lever 78 can quickly and conveniently draw the two components together into abutting engagement of the respective first reference surfaces that will assure a perfect alignment of the alignment tool 10 and work component 12, without need of other tools, or readjustment, and without need to check the alignment with a separate gage. It will be appreciated, however, that the clamp assembly 70 may have a different structure and application of a fastener, alternatively to fastener 76, which could be utilized without tools, or with tools but in a simple manner that does not require use of a second gage or rechecking of the alignment achieved by use of the abutting engagement of the respective first reference surfaces.

Thus, the example clamp assembly 70 is configured to apply a continuous force when in a closed or latched position, to keep the two components securely aligned and in the same position relative to each other, as long as the user wishes and without any additional attention or verification. The clamp assembly 70 may be constructed of steel, carbon fiber or other materials of suitable strength in such a manner that the force applied is self-regulating and independent of normal variations in the interfacing dimensions of the mating components. This may be achieved through the use of latch components which are elastic enough to be pulled tight over center with the resulting deflection of the steel or similar strong but flexible spring material producing the required clamping force to be achieved and maintained without deforming the fastener or latch 76, or side wall 24, through repeated usage cycles. It will be appreciated that the clamp assembly may have alternate structures to generate relative movement of a fastener, and may maintain its position via other configurations than an over-center lever and latch.

In the example shown, the alignment and security of the connection may be enhanced by an additional engagement of reference surfaces between the two components. For instance, additional reference surfaces may prevent forces from tending to rotate, twist or otherwise move the alignment tool 10 relative to the work component 12 in a manner that otherwise might defeat the alignment function. The engagement of such additional surfaces or features need not be particularly accurate but will still act to limit unintended relative movement of the mated components to a degree which will not allow the function of the clamp assembly 70 to be defeated. For example, the alignment tool 10 is shown with an upstanding retention element 90, which in this example is T-shaped, extends in an upright direction, and is suitably sized to be slidably received within the channel 32 and slot 38 of the downward facing T-slot 30 of the work component 12. A T-slot is commonly found in extrusions of typical guide tracks and similar work components. This feature is intentionally relatively loose fitting, so as not to interfere with zero-clearance mating of the respective first reference surfaces 60, 40 of the alignment tool 10 and work component 12.

It will be appreciated that once the retention element 90 is received by the downward facing T-slot 30, the first guide surface or first reference surface 60 of the alignment tool 10 is effectively self-aligning with the first reference surface 40 of the work component 12. The underside of the extensions provided by the T-shape of the retention element 90 present a collective third reference surface 92 of the alignment tool 10. It will be appreciated that when the alignment tool 10 is to be connected to the work component 12, the third reference surface 92 of the alignment tool 10 engages the third reference surface 44 of the work component 12. Indeed, the retention element 90 may be useful in initially aligning the alignment tool 10 with the work component 12, but also may assist in maintaining connection of the two components by preventing rotation of the work component 12 relative to or about the first reference surface 60 of the alignment tool 10. Thus, if the clamp assembly 70 creates any force that would act to draw the top of the first side wall 24 over the wall 62 of the alignment tool, such pivoting or rotation of the work component 12 will be prevented by the engagement of the respective third reference surfaces 44, 92. This aid to retaining the connection between the two components 10, 12 is convenient and highly effective, even though the retention element 90 simply may be sized to be slidable within the downward facing T-slot 30.

For added convenience, the body 50 of the alignment tool 10 may include a notch 94 to accommodate usage of a clamp 96. The notch 94 permits the bar 98 of the clamp 96 to apply a clamp load more directly through the area to be clamped. The head of the clamp 96 may be received by the downward facing T-slot 30 and the clamp 96 may be used to hold the work component 12 in place relative to a work piece. Added convenience in grasping the alignment tool 10 also may be had by inclusion of openings 93 and 95 in the body 50, but it will be appreciated that alternative opening shapes and numbers of openings may be utilized.

As will be appreciated by the above description, the clamp assembly 70 permits rapid connection of the alignment tool 10 to the work component 12, as a user merely must bring the respective first reference surfaces 60, 40 into abutting relationship, move the latch 76 to engage the work component 12 at the first side wall 24, and then move the lever 78 from the unlatched to the latched position to draw together and hold in abutting engagement the first guide surface or first reference surface 60 of the alignment tool 10 and the first wall surface or first reference surface 40 of the work component 12. Abutting engagement of the respective second reference surfaces 62, 42 may assist in aligning the components 10 and 12, as may be the case with use of the retention element 90 to engage respective third reference surfaces 44, 92. The biasing element 80 ensures a firm connection is provided by the latch assembly 70 of the alignment tool 10 and the side wall 24 of the work component 12. It will be appreciated that the biasing element may be provided by means of a different configuration, and further alternatively that the lever and latch or fastener may be configured in a manner that reduces the need for a biasing element, or wherein one or both of the lever or latch is configured to deflect in a manner that provides some resilience without a separate biasing element.

Given that the first guide surface or first reference surface 60 is perpendicular to the first work piece guide surface GS1 of the alignment tool 10, the positive abutting engagement of the first and second reference surfaces 60, 64 of the alignment tool 10 with the respective first and second reference surfaces 40, 42 of the work component 12 will necessarily result in the extruded track of the work component 12 being precisely perpendicular to the first work piece guide surface GS1. The alignment tool 10 and its first work piece guide surface GS1 also extend beneath the track 12, so as to provide an elongated first work piece guide surface GS1 for greater accuracy. These features ensure that when the first work piece guide surface GS1 is placed against an edge of a work piece, the work component 12 will be precisely perpendicular to the work piece, so as to provide precise alignment and cutting of the work piece. In addition, the over-center movement of the lever 78 to the closed position effectively avoids having to account for the problematic influences in the prior art, such as tolerances or movements related to positioning or torque applied to fasteners, or loosening of the two components during use, the need to use a separate gage to check and recheck their alignment, etc. Also, it will be appreciated that the second work piece guide surface GS2 alternatively may be placed against the edge of the work piece to make a cut at the precise preselected angle of the second work piece guide surface GS2.

It will be appreciated that the first example alignment tool 10 of the present disclosure provides for a method of connecting an alignment tool 10 to a work component 12 for use in aligning the work component 12 with a work piece, wherein the work component 12 has at least a first side wall surface 40 extending longitudinally in a first direction and at least a T-shaped slot 30 spaced apart from the at least first side wall surface 40 and extending longitudinally in the first direction. The method comprises the steps of: holding the alignment tool 10 in a position adjacent an end of the work component 12, wherein the alignment tool 10 includes a body 50 having at least a first reference surface 60 extending in the first direction, a retention element 90 spaced from the at least first reference surface 60, at least a first guide surface GS1 extending in a second direction that is perpendicular to the first direction, and a clamp assembly 70 connected to the body 50; moving the alignment tool 10 toward the work component 12 so as to insert the retention element 90 into the T-shaped slot 30 that is spaced from the at least first side wall surface 40 of the work component 12; moving the at least first reference surface 60 of the alignment tool 10 into a position opposite the first side wall surface 40 of the work component 12; extending a fastener 76 of the clamp assembly 70 in the second direction beyond the first side wall surface 40 of the work component 12; moving the clamp assembly 70 to engage the first side wall surface 40 of the work component 12 and to draw together and hold in abutting engagement the at least first reference surface 60 of the alignment tool 10 and the first side wall surface 40 of the work component 12.

Turning now to a second example embodiment of an alignment tool 110, shown in FIGS. 6-10. It will be appreciated that the second example shares some features with the first example alignment tool 10, but differs in a few respects that are evident when showing the alignment tool 110 for use with the above-referenced work component 12. However, as with the first example alignment tool 10, it will be appreciated that the second example alignment tool 110 may be used with alternative work components and may be configured in alternative ways. For ease of comprehension, reference numerals used in the description of the first example also will be used with the second example for features in common.

Similar to the first example, the second example alignment tool 110 is configured to achieve precise alignment with the work component 12 via abutting complementary reference surfaces, while also providing one or more guide surfaces for abutting a work piece or other object to be cut or otherwise positioned by use of the alignment tool. However, the alignment tool 110 includes a body 150 that advantageously may be used with the work component 12 at either end of the work piece because it has two opposed, parallel elongated work piece guide surfaces. The body 150 may be constructed of similar materials and in a similar way to the body 50 of the first example. In the second example, an outer perimeter of the body 150 includes a first side wall 152, second side wall 154, third side wall 155, fourth side wall 156 and fifth side wall 158. It will be appreciated that other configurations may be provided with fewer or more side walls, and the side walls may provide guide surfaces. For example, the first side wall 152 presents a first work piece guide surface GS1', while the fourth side wall 156 presents a second work piece guide surface GS2' that faces in an opposite direction and is parallel to the first work piece guide surface GS1'. It will be appreciated that a guide surface may extend along at least a portion of a side wall or other surface of the body 150 and may extend in a continuous or segmented manner, or otherwise may be defined by at least two spaced apart features or portions.

Similar to the first example, the body 150 of the alignment tool 110 also includes a first guide surface or first reference surface 160 provided by an upstanding rib or wall 162 that extends longitudinally in the first direction, and is located along a central region of the body 150. It will be appreciated that the first guide surface or first reference surface 160 and wall 162 are taller than the respective surface 60 and wall 62 of the first example. The added height will tend to provide a more complete backstop or support for the wall 24 of the work component 12, which advantageously may help to avoid potential deformation of the wall 24 when repeatedly subjected to a clamping load. It also will be appreciated that the first work piece guide surface GS1' extends in a second direction that is perpendicular to the first guide surface or first reference surface 160, and that the first guide surface or first reference surface 160 extends in an upright direction.

In addition, similar to the first example, the body 150 further includes a second guide surface or second reference surface 164, which is upward facing, and therefore, perpendicular to the first guide surface or first reference surface 160. The second guide surface or second reference surface 164 provides a landing against which the work component 12 may rest. Although they are shown as continuous elongated surfaces, it will be appreciated that, similarly to the first example, each of the first and second reference surfaces 160, 164 of the alignment tool 110 may extend in a continuous or segmented manner, or otherwise may be defined by at least two spaced apart features or portions. Indeed, the first guide surface or first reference surface 160 of the second example actually includes two spaced apart portions 160' at its ends that are parallel to each other and shown as roughly ½" long, with an elongated wall extending between them but featuring a maximum recess or relief of roughly 0.005" from the surface 160 defined by the parallel portions. This alternative first guide surface or first reference surface 160 with a centrally located relief advantageously ensures that the two spaced apart portions 160' are utilized to effectively define the one desired reference surface for abutting engagement with the work component 12. This configuration for first guide surface or first reference surface 160 may improve the ability to ensure precise abutting engagement with a first reference surface 40 of a work component 12, even if the wall 24 of work component 12 happens to have some minor deformation, such as a small dent.

The alignment tool 110 further includes the clamp assembly 70 of the first example alignment tool 10, other than a lever 178 that has a slightly different shape than lever 78, but which functions in the same way. Thus, the clamp assembly 70 of the second example alignment tool 110 is configured to be mounted to the body 150 and to extend in the second direction past at least the first guide surface or first reference surface 160 of the alignment tool 110. The clamp assembly 70 includes a base 72 that is connected to the body 150. However, in the second example, the base 72 is connected to the body 150 at a height that is lower relative to the second reference surface 164 or to the bottom of the rib or wall 162, when compared to the first example alignment tool 10. This effectively lowers the clamp assembly 70 relative to the bottom of the work component 12, and thereby advantageously slightly repositions the pulling force of the clamp assembly 70 to reduce the tendency to introduce a force that might tend to cause rotation of the work component 12 about the first guide surface or first reference surface 160 of the alignment tool 110. The clamp assembly 70 also includes a fastener 76 in the form of a latch, a lever 178, and biasing element 80 that is connected to the base 72, lever 78 and latch 76. The fastener or latch 76, lever 178 and biasing element 80 are constructed and connected to permit the lever 178 to operate the latch 76, under the influence of the bias element 80.

As with the first example, the fastener or latch 76 extends in the second direction past the first guide surface or first reference surface 160 of the alignment tool 110, as well as past the first side wall surface or first reference surface 40 of the work component 12. This is so that that fastener or latch 76 can capture the work component 12, such as via the flange 82 at the distal end 84 of the latch 76. It will be appreciated that, as the latch 76 extends in the second direction, perpendicular to and across the first guide surface or first reference surface 160 of the alignment tool 110, it also is extending parallel to the respective first work piece guide surface GS1' and second work piece guide surface GS2'. Accordingly, when the lever 178 is pivoted upward, the latch 76 moves to extend further from the base 72, which allows the latch 76 to pivot to raise the flange 82 at the distal end 84 of the latch 76 to the open position shown in FIG. 9. The pivotal positions of the lever 178 and latch 76 are configured to have an over-center movement to a closed position, which utilizes the biasing element 80, in the form of a spring, so that when the lever 178 is pivoted downward toward the closed position shown in FIGS. 6-8A, the flange 82 of the latch 76 has been drawn closer toward the base 72 of the clamp assembly 70. As described with respect to the first example, the clamp assembly 70 may be constructed of steel, carbon fiber or other materials of suitable strength in such a manner that the force applied is self-regulating and independent of normal variations in the interfacing dimensions of the mating components. This may be achieved through the use of a biasing element and/or use of latch components which are elastic enough to be pulled tight over center with the resulting deflection of the steel or similar strong but flexible spring material producing the required clamping force to be achieved and maintained without deforming the fastener or latch 76, or side wall 24, through repeated usage cycles. It will be appreciated that the clamp assembly may have alternate structures to generate relative movement of a fastener, and may maintain its position via other configurations than an over-center lever and latch.

Figure 7:
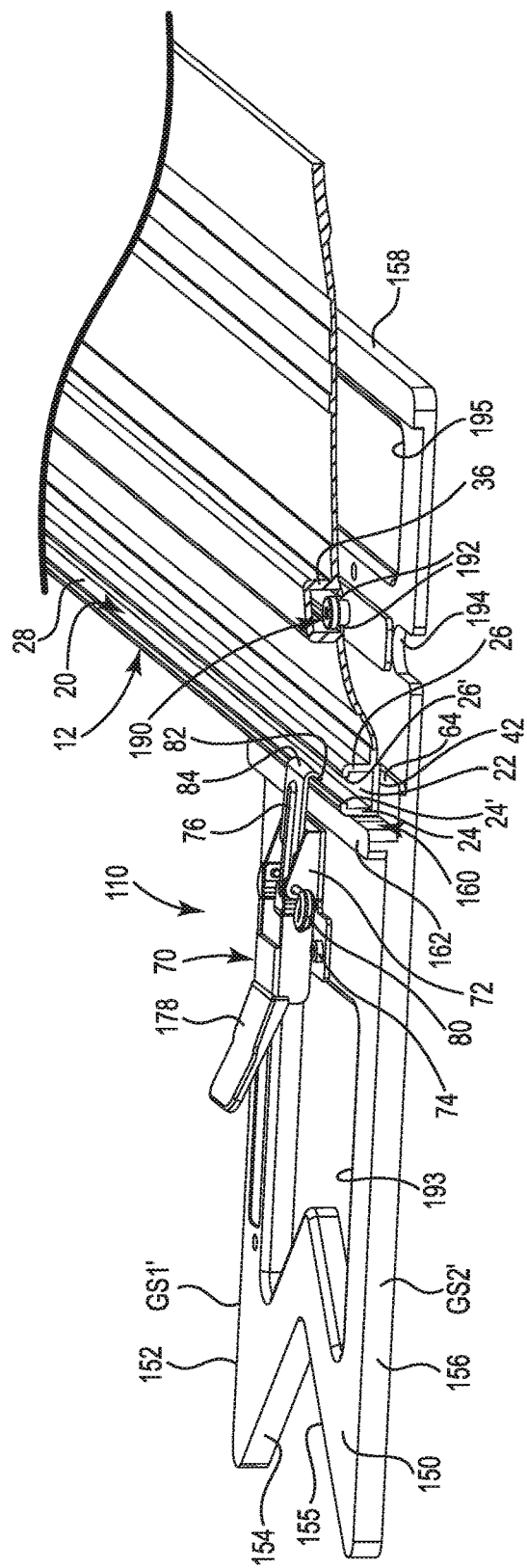
FIG. 7 is a perspective end view of the second example alignment tool removably connected to the work component of FIG. 6.
Figure 8:
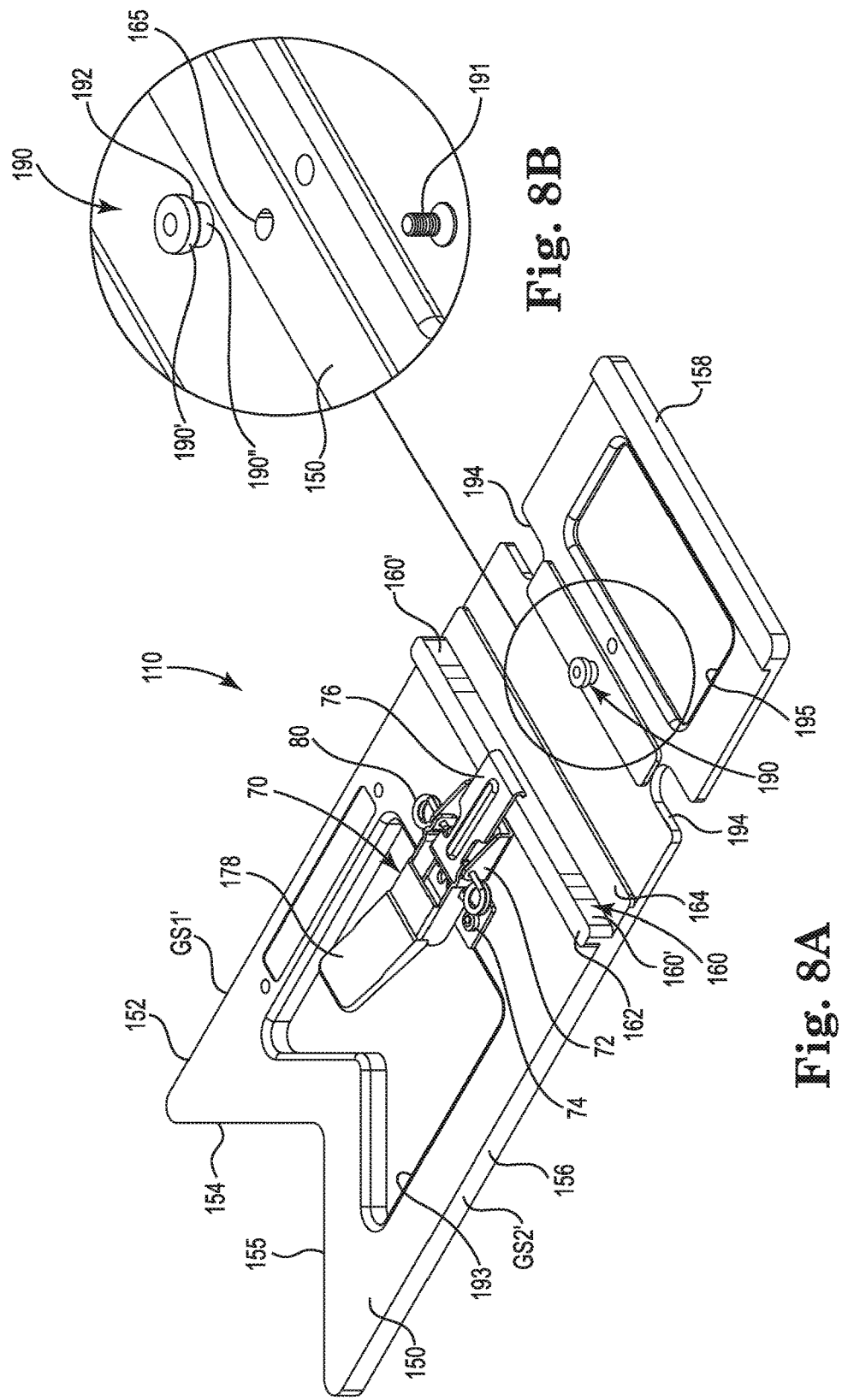
FIG. 8A is a perspective top view of the second example alignment tool of FIG. 6, with the clamp assembly in a closed position.
FIG. 8B is a perspective exploded view of a retention feature on the second example alignment tool of FIG. 6.
Figure 9:
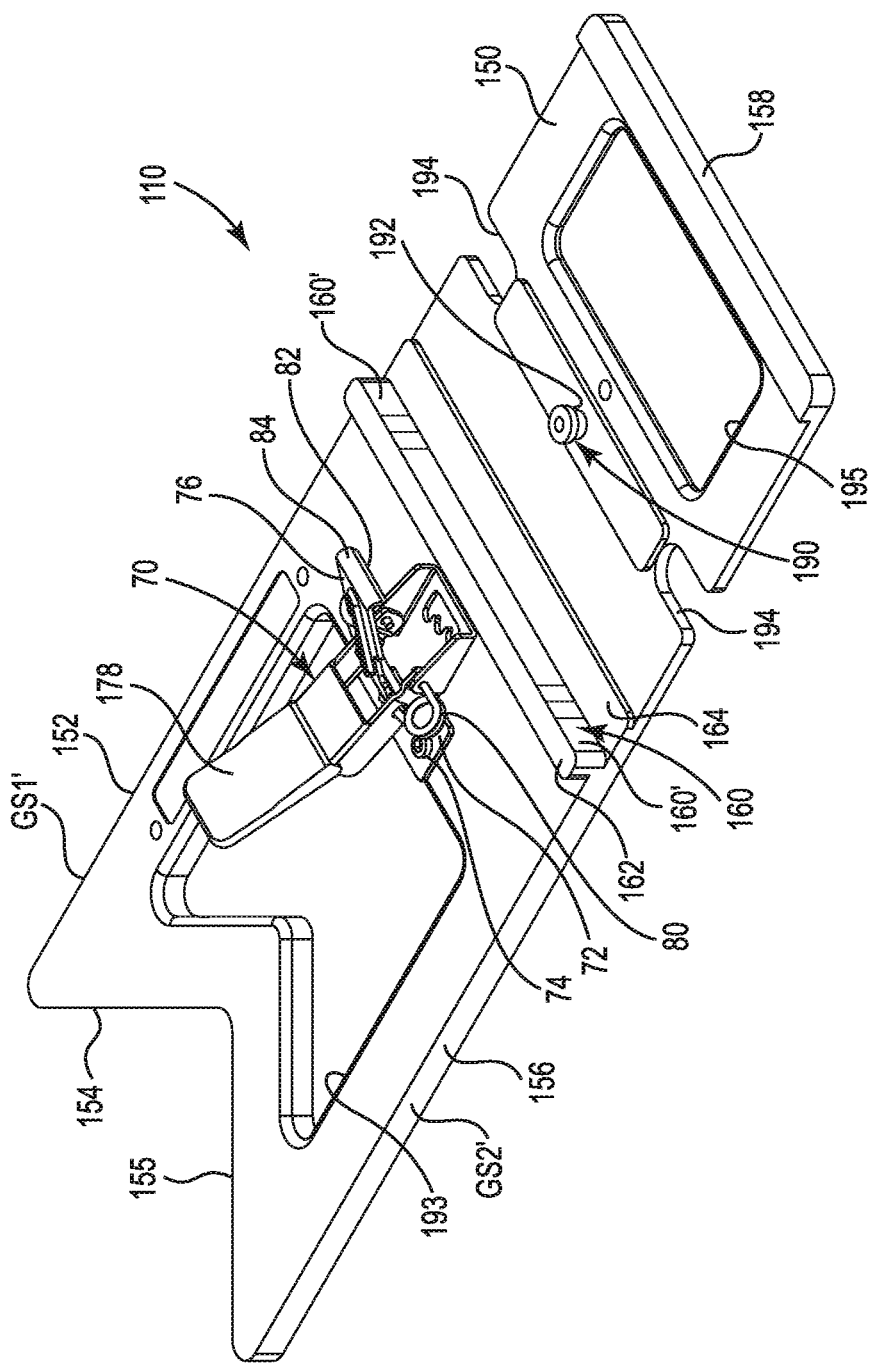
FIG. 9 is a perspective top view of the second example alignment tool of FIG. 6, with the clamp assembly in an open position, ready for slidable introduction to the work component.
Figure 10:
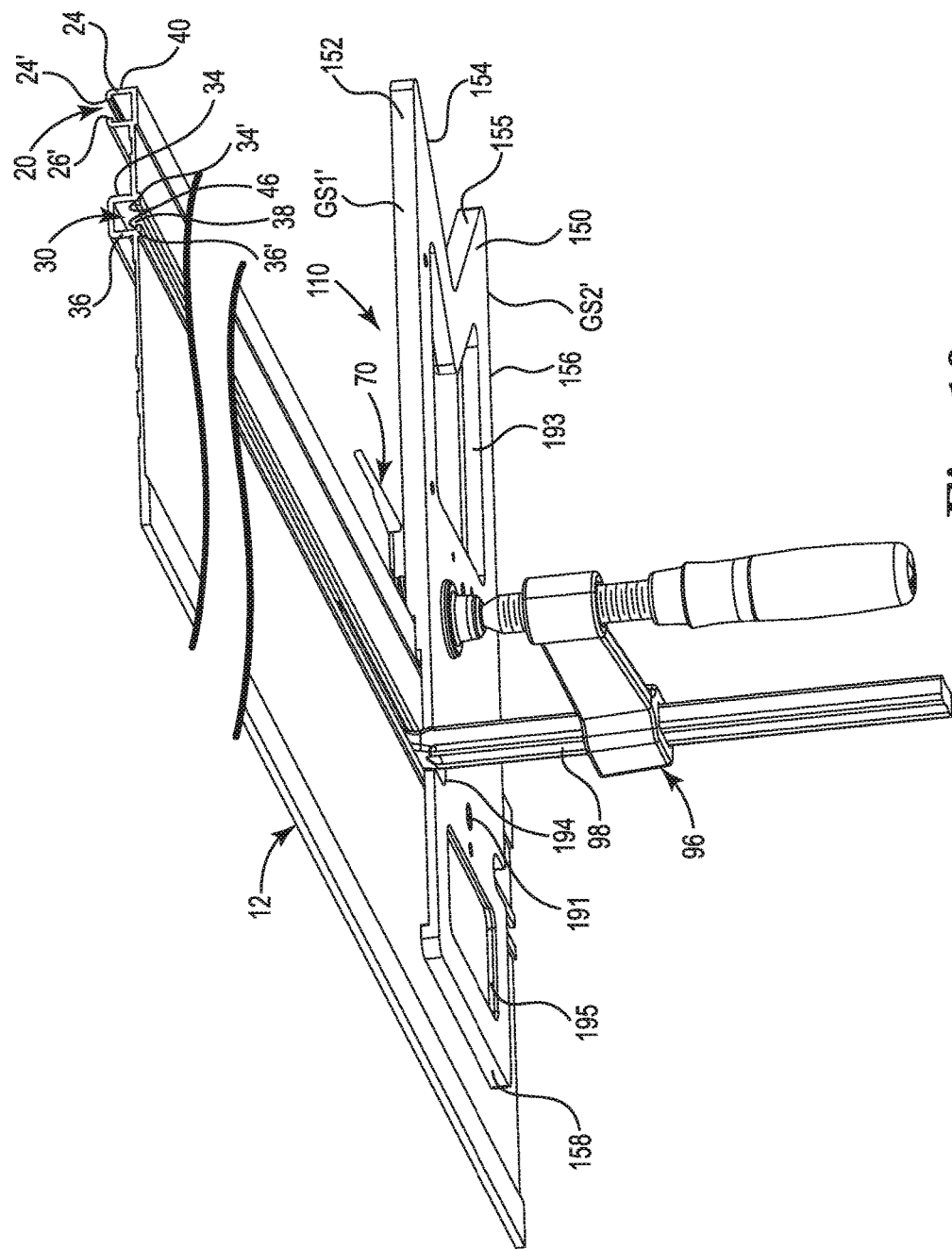
FIG. 10 is a perspective bottom view of the second example alignment tool removably connected to the work component of FIG. 6 and positioned relative to a work piece with a portion of a clamp passing through a clamp receiving notch.

FIG. 7 is particularly instructive regarding the connection of the alignment tool 110 and work component 12. FIG. 7 shows the first guide surface or first reference surface 160 of the alignment tool 110 has been brought into abutting engagement with the first side wall surface or first reference surface 40 provided by the outer surface of the first side wall 24 of the work component 12. The second reference surface 164 of the alignment tool 110 also has been brought into abutting engagement with the second reference surface of 42 of the work component 12. The flange 82 at the distal end 84 of the fastener or latch 76 also has been positioned to extend past the first guide surface or first reference surface 160 of the alignment tool 110 and past the first side wall surface or first reference surface 40 of the work component 12, and has been pivoted downward, so as to engage the lip 24' at the third reference surface 44 on the inner surface of the first side wall 24 of the work component 12. With the lever 178 pivoted downward to a closed position, the fastener or latch 76 and its flange 82 are pulled toward the base 72 until the first guide surface or first reference surface 160 of the alignment tool 110 is securely abutting the first side wall surface or first reference surface 40 of the work component 12, with the first guide surface or first reference surface 160 defined by the parallel spaced apart portions 160', and depending on the force applied by the clamp assembly 70, the first side wall surface or first reference surface 40 of the work component 12 may engage the recessed portion between the portions 160'.

As in the first example, the over-center travel of the lever 178 of the second example causes it to automatically be retained in the closed position, until a deliberate force is applied to move the lever 178 by pivoting to an open position. Also, the biasing element 80 biases the latch 76 toward the base 72, which additionally aids in maintaining a firm connection between the alignment tool 110 and work component 12. Thus, the two components can be quickly and conveniently drawn together into abutting engagement of the respective first reference surfaces 160, 40 that will assure precise and secure alignment of the alignment tool 110 and work component 12. As noted with respect to the first example, while this engagement is achievable without need of other tools or to check the alignment with a separate gage, an alternative clamp assembly may be used while still taking advantage of the abutting engagement between the respective first reference surfaces. Thus, the example clamp assembly 70 is configured to achieve a similar connection to that described with respect to the first example and may be constructed of similar materials to those previously discussed so as to produce the required clamping force to be achieved and maintained without deforming the fastener or latch 76, or side wall 24, through repeated usage cycles. As described, the structures of the body 150 of the second example also included a few advantageous modifications that will impact the support for the work component 12 and the application of the force of the clamp assembly.

As with the first example, the security of the connection for the second example alignment tool 110 may be enhanced by an additional engagement of reference surfaces between the two components. For example, the alignment tool 110 is shown with an upstanding retention element 190, which in this example would be T-shaped in cross-section, but also may be described as providing a button configuration. As seen in FIGS. 7, 8A and 8B, the retention element 190 extends in an upright direction similar to the earlier example retention element 90, but has a button or disc shape 190' that is suitably sized to be slidably received within the channel 32, while having a post 190" that is suitably sized to be slidably received within the slot 38 of the downward facing T-slot 30 of the work component 12. The post 190" also receives a fastener, such as a flat head screw 191, which extends through a slightly elongated hole 165 in the body 150. The post 190" may include a threaded passage to receive the fastener 191. The fastener 191 may be tightened completely to hold the retention element 190 in a set position, but it may advantageously be used with a thread locking compound or nylon locking element to retain the fastener in a chosen position relative to the post 190", without exerting a clamping load. This configuration allows the connection of the fastener 191 to the post 190" to be established in a manner that permits the fastener 191 to move within the hole 165 toward and away from the first guide surface or first reference surface 160, as may be needed when engaging the T-slot 30 in the work component 12. Thus, this configuration of retention element 190 provides an alternative that still may be considered to be T-shaped but advantageously is self-aligning relative to the work component 12, which can account for slight variations in the distance between the outer wall 24 and the T-slot 30, while effectively providing draft angles for easy insertion into the T-slot 30. Accordingly, this is another way to intentionally provide a relatively loose fitting retention element, so as to self-align but not interfere with zero-clearance mating of the respective first reference surfaces 160, 40 of the alignment tool 110 and work component 12.

It will be appreciated that once the retention element 190 is received by the downward facing T-slot 30, the underside of the button 190' provided by the T-shape of the retention element 190 presents a collective third reference surface 192 of the alignment tool 110. It further will be appreciated that when the alignment tool 110 is to be connected to the work component 12, the third reference surface 192 of the alignment tool 110 engages the third reference surface 44 of the work component 12. Indeed, the retention element 190 may be useful in initially aligning the alignment tool 110 with the work component 12, but also may assist in maintaining connection of the two components by preventing rotation of the work component 12 relative to or about the first reference surface 60 of the alignment tool 110. Thus, if the clamp assembly 70 creates any force that would act to draw the top of the first side wall 24 over the wall 62 of the alignment tool, such pivoting or rotation of the work component 12 will be prevented by the engagement of the third reference surfaces 44, 192. This aid to retaining the connection between the two components 110, 12 is convenient and highly effective, even though the retention element 190 may be self-aligning by being sized to be slidable within the downward facing T-slot 30 and/or connected to the body 150 at a slightly elongated hole 165 that permits movement of the fastener 191 of the retention element 190.

Similar to the body 50 of the alignment tool 10 of the first example, the body 150 of the alignment tool 110 of the second example may include notches 194 for added convenience in accommodating usage of a clamp 96. The notches 194 extend inward from the respective first and second work piece guide surfaces GS1', GS2' to permit the bar 98 of the clamp 96 to apply a clamp load more directly through the area to be clamped. As with the first example, the head of the clamp 96 may be received by the downward facing T-slot 30 and the clamp 96 may be used to hold the work component 12 in place relative to a work piece. Added convenience in grasping the alignment tool 110 also may be had by inclusion of openings 193 and 195 in the body 150, but it will be appreciated that alternative opening shapes and numbers of openings may be utilized.

Figure 6:
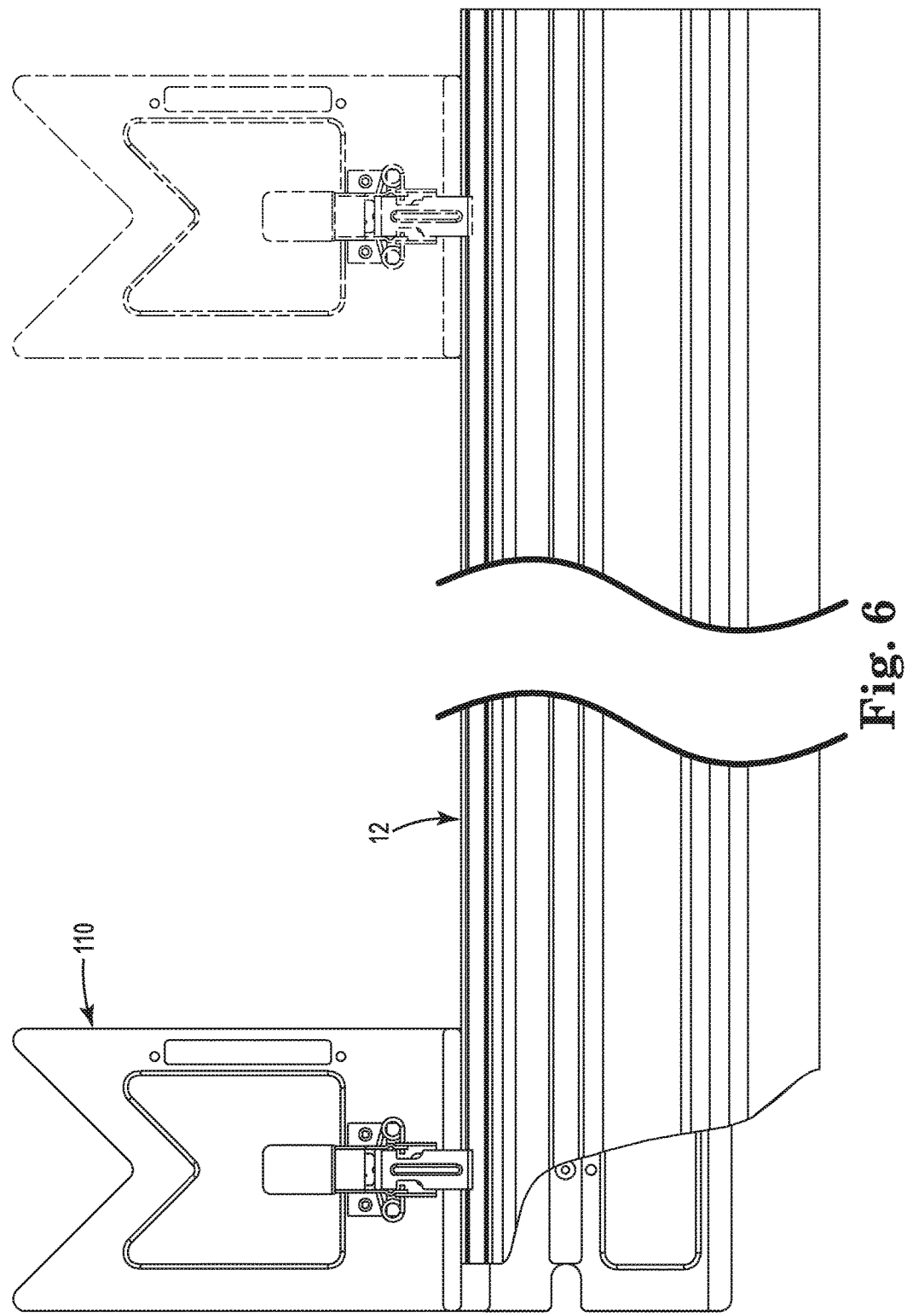
FIG. 6 is a top view of a second example alignment tool removably connected to a work component in the form of a track saw rail in a first position proximate a first end of the track saw rail, and shown in phantom in a second position proximate a second, opposite end of the track saw rail.

In accordance with FIG. 6, it will be appreciated that the main advantage of the second example alignment tool 110 relative to the first example alignment tool 10 is that the alignment tool 110 may be located at either end of a work piece because it can slide along the work component 12 and be positioned either proximally or distally (shown in dashed lines), so as to present either the first work piece guide surface GS1' along a proximal edge of a work piece, or present the second work piece guide surface GS2' along a distal edge of a work piece (work piece not shown).

As will be appreciated by the above description, the clamp assembly 70 permits rapid connection of the alignment tool 110 to the work component 12, as a user merely must bring the respective first reference surfaces 160, 40 into abutting relationship, move the latch 76 to engage the work component 12 at the first side wall 24, and then move the lever 78 from the unlatched to the latched position to draw together and hold in abutting engagement the first guide surface or first reference surface 160 of the alignment tool 110 and the first wall surface or first reference surface 40 of the work component 12. Abutting engagement of the respective second reference surfaces 162, 42 may assist in aligning the components 110 and 12, as may be the case with use of the retention element 190 to engage respective third reference surfaces 192. The biasing element 80 ensures a firm connection is provided by the latch assembly 70 of the alignment tool 110 and the side wall 24 of the work component 12, although it will be appreciated that the lever and latch or fastener may be configured in a manner that reduces the need for a biasing element, or wherein one or both of the lever or latch is configured to deflect in a manner that provides some resilience.

Given that the first guide surface or first reference surface 160 is perpendicular to the respective first and second work piece guide surfaces GS1' and GS2' of the alignment tool 110, the positive abutting engagement of the first and second reference surfaces 160, 164 of the alignment tool 110 with the respective first and second reference surfaces 40, 42 of the work component 12 will necessarily result in the extruded track of the work component 12 being precisely perpendicular to either the first work piece guide surface GS1' or second work piece guide surface GS2'. The alignment tool 110 and its respective first and second work piece guide surfaces GS1' and GS2' also extend beneath the track 12, so as to provide elongated first and second work piece guide surfaces GS1' and GS2' for greater accuracy. These features ensure that when either work piece guide surface is placed against an edge of a work piece, the work component 12 will be precisely perpendicular to the work piece, so as to provide precise alignment and cutting of the work piece. In addition, the over-center movement of the lever 178 to the closed position effectively avoids having to account for the problematic influences in the prior art, such as tolerances or movements related to positioning or torque applied to fasteners, or loosening of the two components during use, the need to use a separate gage to check and recheck their alignment, etc.

As with the first example alignment tool 10, it will be appreciated that the second example alignment tool 110 of the present disclosure provides for a method of connecting an alignment tool 110 to a work component 12 for use in aligning the work component 12 with a work piece, wherein the work component 12 has at least a first side wall surface 40 extending longitudinally in a first direction and at least a T-shaped slot 30 spaced apart from the at least first side wall surface 40 and extending longitudinally in the first direction. The method comprises the steps of: holding the alignment tool 110 in a position adjacent an end of the work component 12, wherein the alignment tool 110 includes a body 150 having at least a first reference surface 160 extending in the first direction, a retention element 190 spaced from the at least first reference surface 160, at least a first guide surface GS1' extending in a second direction that is perpendicular to the first direction, and a clamp assembly 70 connected to the body 150; moving the alignment tool 110 toward the work component 12 so as to insert the retention element 190 into the T-shaped slot 30 that is spaced from the at least first side wall surface 40 of the work component 12; moving the at least first reference surface 160 of the alignment tool 110 into a position opposite the first side wall surface 40 of the work component 12; extending a fastener 76 of the clamp assembly 70 in the second direction beyond the first side wall surface 40 of the work component 12; moving the clamp assembly 70 to engage the first side wall surface 40 of the work component 12 and to draw together and hold in abutting engagement the at least first reference surface 160 of the alignment tool 110 and the first side wall surface 40 of the work component 12.

From the above disclosure, it will be appreciated that alignment tools for use with work components may be constructed in accordance with the present disclosure and may be provided in various configurations. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such alignment tools, as well as in the method of assembling an alignment tool to a work component, without departing from the scope or spirit of the claimed subject matter, and that the claims are not limited to the preferred embodiments and methods illustrated herein. The example alignment tools shown herein may exhibit one or more of the above-referenced potential advantages, depending upon the specific design chosen. It also will be appreciated that the example embodiments may be shown in simplified form, so as to focus on the key components and to avoid including structures that are not necessary to the disclosure and that would over complicate the drawings.

The invention claimed is:

1. An alignment tool for connection to a work component, comprising:
   a generally planar body;
   a retention member that extends upward from the body;
   a clamp assembly spaced from the retention member and being connected to the body;
   a first reference surface that extends upward from the body and is located between the retention member and where the clamp assembly is connected to the body;
   the clamp assembly having a fastener that extends toward the retention member and past the first reference surface; and
   wherein the clamp assembly is movable to draw a distal end of the fastener in a direction toward where the clamp assembly is connected to the body, and the fastener is biased to move the distal end of the fastener toward the first reference surface.

2. The alignment tool in accordance with claim 1, wherein the clamp assembly further comprises a base connected to the body.

3. The alignment tool in accordance with claim 2, wherein the first reference surface extends in a first direction and the base is positioned to have the fastener extend at an angle relative to the first reference surface.

4. The alignment tool in accordance with claim 3, wherein the clamp assembly further comprises a biasing element that is connected to the base and the fastener.

5. The alignment tool in accordance with claim 1, wherein the clamp assembly further comprises a lever and the fastener is a latch, with the latch being connected to the lever.

6. The alignment tool in accordance with claim 5, wherein the clamp assembly further comprises a base connected to the body, the lever is pivotally connected to the base and the latch is pivotally connected to the lever.

7. The alignment tool in accordance with claim 1, wherein the work component is a track saw rail for use with a circular saw.

8. The alignment tool in accordance with claim 1, wherein a second reference surface of the body extends in a second direction.

9. The alignment tool in accordance with claim 8, wherein the second reference surface is adjacent to the first reference surface.

10. The alignment tool in accordance with claim 1, wherein the retention element is T-shaped.

11. The alignment tool in accordance with claim 1, wherein a side of the body comprises a guide surface.

12. The alignment tool in accordance with claim 11, wherein the guide surface is at an angle relative to the first reference surface.

13. The alignment tool in accordance with claim 1, wherein the body further comprises at least one notch that extends inward from a side of the body and permits passage of a portion of a clamp.

14. The alignment tool in accordance with claim 1, wherein the body further comprises at least one opening that provides for grasping of the alignment tool.

15. An alignment tool for connection to a work component and for use in aligning the work component with a work piece, the alignment tool comprising:
 a body having a first reference surface that extends upward and in a first direction;
 a retention member that extends upward and is spaced from the first reference surface in a second direction;
 a clamp assembly connected to the body and having a fastener that extends in the second direction past the first reference surface; and
 wherein the fastener has a distal end and the clamp assembly is movable to draw the distal end toward the first reference surface.

16. The alignment tool in accordance with claim 15, wherein the clamp assembly further comprises a base that is connected to the body, a biasing element that is connected to the base and the fastener, and the biasing element biases the fastener toward the base.

17. The alignment tool in accordance with claim 16, wherein the fastener is a latch and the clamp assembly further comprises a lever pivotally connected to the base, and the latch is pivotally connected to the lever.

18. The alignment tool in accordance with claim 15, wherein the retention member is T-shaped.

19. The alignment tool in accordance with claim 15, wherein the work component is a track saw rail for use with a circular saw.

20. The alignment tool in accordance with claim 19, wherein the body further comprises a work piece guide surface that extends at an angle relative to the first reference surface.

* * * * *